(12) United States Patent
Hamilton, II et al.

(10) Patent No.: US 8,127,236 B2
(45) Date of Patent: Feb. 28, 2012

(54) VIRTUAL UNIVERSE SUBJECT MATTER EXPERT ASSISTANCE

(75) Inventors: Rick A. Hamilton, II, Charlottesville, VA (US); Steven M. Harrison, Bremerton, WA (US); Brian M. O'Connell, Cary, NC (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 529 days.

(21) Appl. No.: 12/209,601

(22) Filed: Sep. 12, 2008

(65) Prior Publication Data
US 2010/0070883 A1    Mar. 18, 2010

(51) Int. Cl.
*G06F 3/048* (2006.01)
(52) U.S. Cl. .......... 715/757; 715/706
(58) Field of Classification Search .......... 715/757, 715/705–708, 758
See application file for complete search history.

(56) References Cited

U.S. PATENT DOCUMENTS

| | | | |
|---|---|---|---|
| 5,862,223 A * | 1/1999 | Walker et al. | 705/50 |
| 6,219,045 B1 * | 4/2001 | Leahy et al. | 715/757 |
| 6,396,509 B1 * | 5/2002 | Cheng | 715/706 |
| 7,027,975 B1 | 4/2006 | Pazandak et al. | |
| 7,036,128 B1 | 4/2006 | Julia et al. | |
| 7,249,045 B2 | 7/2007 | Lauffer | |
| 7,444,315 B2 * | 10/2008 | Wu | 706/50 |
| 7,685,198 B2 * | 3/2010 | Xu et al. | 707/748 |
| 7,831,928 B1 * | 11/2010 | Rose et al. | 715/810 |
| 2002/0049738 A1 * | 4/2002 | Epstein | 707/1 |
| 2002/0052913 A1 * | 5/2002 | Yamada et al. | 709/202 |
| 2004/0044542 A1 * | 3/2004 | Beniaminy et al. | 705/1 |
| 2004/0148347 A1 * | 7/2004 | Appelman et al. | 709/204 |
| 2005/0131722 A1 * | 6/2005 | Hillis et al. | 705/1 |
| 2005/0137015 A1 * | 6/2005 | Rogers et al. | 463/42 |
| 2006/0229999 A1 * | 10/2006 | Dodell et al. | 705/80 |

(Continued)

FOREIGN PATENT DOCUMENTS

WO    00/057326    9/2000

(Continued)

OTHER PUBLICATIONS

WoWWiki—Cat Form, Aug. 10, 2007, retrieved via Internet Archive on Apr. 11, 2011 at http://replay.waybackmachine.org/20070819045047/www.wowwiki.com/Cat_form.*

*Primary Examiner* — Kieu Vu
*Assistant Examiner* — James T Durkin
(74) *Attorney, Agent, or Firm* — Patrick J. Daugherty; Driggs, Hogg, Daugherty & Del Zoppo Co., LPA

(57) ABSTRACT

Methods, devices and systems are provided for enabling virtual universe users to find and engage subject matter experts within a virtual universe by defining a virtual universe subject matter expert conduit within the virtual universe. A virtual universe user avatar engages the conduit and a user indicates a subject matter expert search term. A data storage is searched for a tag relevant to the search term, and an expert-avatar is identified and located through the relevant tag. The user is enabled to directly communicate with the identified expert-avatar through a conduit communication medium entirely within the virtual universe, without requiring the user to engage a resource outside of the virtual universe or without requiring the user to engage an interface outside of the virtual universe.

13 Claims, 2 Drawing Sheets

U.S. PATENT DOCUMENTS

| | | |
|---|---|---|
| 2007/0087799 A1 * | 4/2007 | Van Luchene .................... 463/1 |
| 2007/0162432 A1 | 7/2007 | Armstrong et al. |
| 2007/0174389 A1 | 7/2007 | Armstrong et al. |
| 2007/0206086 A1 * | 9/2007 | Baron et al. ............... 348/14.01 |
| 2008/0146343 A1 * | 6/2008 | Sullivan et al. ................. 463/42 |
| 2008/0220876 A1 * | 9/2008 | Mehta et al. .................... 463/42 |
| 2008/0303811 A1 * | 12/2008 | Van Luchene ................ 345/419 |
| 2009/0054140 A1 * | 2/2009 | Beser et al. ..................... 463/31 |

FOREIGN PATENT DOCUMENTS

| | | |
|---|---|---|
| WO | 01/050387 | 7/2001 |
| WO | WO0161565 A1 * | 8/2001 |

\* cited by examiner

VIRTUAL UNIVERSE SUBJECT MATTER EXPERT ASSISTANCE

FIELD OF THE INVENTION

The present invention generally relates to locating information providers within a Virtual Universe (VU), and more particularly to methods, systems, and program products for identifying virtual universe users as subject matter experts, and enabling other virtual universe users to find and contact experts through the VU interface.

BACKGROUND OF THE INVENTION

A Virtual Universe (VU) is a computer-based simulated world or environment; other terms for VU's include metaverses, "3-D Internet" and Virtual World, and VU will be understood to represent any of these environments. Users inhabit and traverse a VU, and interact with other VU users, through the use of an avatar, a graphical representation of the user often taking the form of a cartoon-like human though any graphic image may be utilized. In order to participate within or inhabit a VU a user creates an agent which functions as the user's account, and upon which the user builds an avatar tied to an inventory of assets the user owns in the VU and associated with the agent.

VU assets, avatars and anything presented to a user as visual information comprise Universally Unique Identifiers (UUID's) tied to geometric data distributed to users as textual coordinates), textures distributed to users as graphics files (for example as a JPEG2000 file), and effects data rendered by the user's client computer according to the user's preferences and user's computer system device capabilities. Many VU's are represented using three dimensional (3-D) graphics and landscapes and are populated by many thousands of users or residents, often resembling the real world or fantasy/fictional worlds in terms of physics, houses, landscapes and in interpersonal communications with other users.

Large robust VU's and massively multiplayer online games, such as for example Second Life® (SECOND LIFE is a trademark of Linden Research, Inc. in the United States and/or other countries), Entropia Universe™ (ENTROPIA UNIVERSE is a registered trademark of MindArk PE AB in the United States, other countries, or both), The Sims Online™ (THE SIMS ONLINE is a trademark of Electronic Arts, Inc in the United States, other countries, or both), and There™ (THERE is a trademark of Makena Technologies, Inc. in the United States, other countries, or both) render and display detailed, large and complex graphic environments within which users may travel and participate as if a character in an expressionistic or fantastical fictional world or within a realistic or representational approximation of real life.

VU's are also commonly defined with respect to VU regions, virtual areas of land within the VU typically residing on a single server, with each region amenable to provision and management by a one or more participating providers. In one aspect the size and complexity and variety of resources found in a VU is related to the number of providers participating and hosting regions through server hosting. And the success of a VU may depend upon attracting users and keeping them engaged and participating in the VU, thereby adding value to the providers who bear the cost in providing VU region content and services (and correspondingly expect an appropriate level of multiple-user engagement as a return on their investment), as well as for other users who wish to engage many others in a large virtual community. For example an informational or service-related region managed by a governmental or non-profit organization may desire or expect a given level of VU user engagement and participation, and commercial region providers may desire to engage in a given level of commercial transactions (e.g. sales) or achieve a level of marketing exposure among VU users.

In one aspect, the value of a VU to a user is dependent upon the comprehensive nature of the experience. Keeping users engaged and participating in a VU (thereby satisfying provider expectations) requires meeting user needs and expectations, otherwise the user will exit the VU and satisfy his needs elsewhere, for example through other VU or real-world resources. In one example VU's that strive to offer customer and informational services to users have difficulty in effectively offering comprehensive information to users. VU's do not offer the same robust search-and-retrieval options offered by the real-world, for example browser applications that may quickly search the Internet or other databases for information. And even if a browser function is incorporated, the nature of information retrieved (for example hyperlinks to web sites and text document references) takes the user out of the VU and experience: any illusion that the user is immersed within another world is destroyed, the user thus reminded of the outside or real world again, and once reminded may more quickly disengage from the VU experience and look elsewhere for the information sought, in some cases finding much more efficient means or competing providers and not returning to the VU.

SUMMARY OF THE INVENTION

Methods, devices and systems are provided for enabling virtual universe residents to find and engage subject matter experts within a virtual universe. Methods include defining a subject matter expert conduit within a virtual universe, the conduit comprising a communication medium. An avatar of a user engaging the conduit indicates a subject matter expert search term, wherein the conduit searches a data storage for a tag relevant to the search term and identifies and locates an expert-avatar tagged with the relevant tag. The conduit enables the user to directly communicate with the identified expert-avatar through the conduit communication medium entirely within the virtual universe, without the user directly engaging a resource outside of the virtual universe or without requiring the user to engage in a communication interface outside of the virtual universe.

In another aspect, service methods are provided comprising deploying applications for enabling virtual universe residents to find and engage subject matter experts within a virtual universe according to the method steps described above, for example by a service provider who offers to implement, deploy, and/or perform functions for others. Still further, articles of manufacture comprising a computer usable medium having a computer readable program in said medium are provided. Such program code comprises instructions which, when executed on a computer system, cause the computer system to perform one or more method and/or process elements described above for enabling virtual universe residents to find and engage subject matter experts within a virtual universe. Moreover, systems, articles and programmable devices configured for performing one or more method and/or process elements of the current invention are also provided for enabling virtual universe residents to find and engage subject matter experts within a virtual universe, for example as described above.

BRIEF DESCRIPTION OF THE DRAWINGS

These and other features of this invention will be more readily understood from the following detailed description of the various aspects of the invention taken in conjunction with the accompanying drawings in which.

Figure 1:
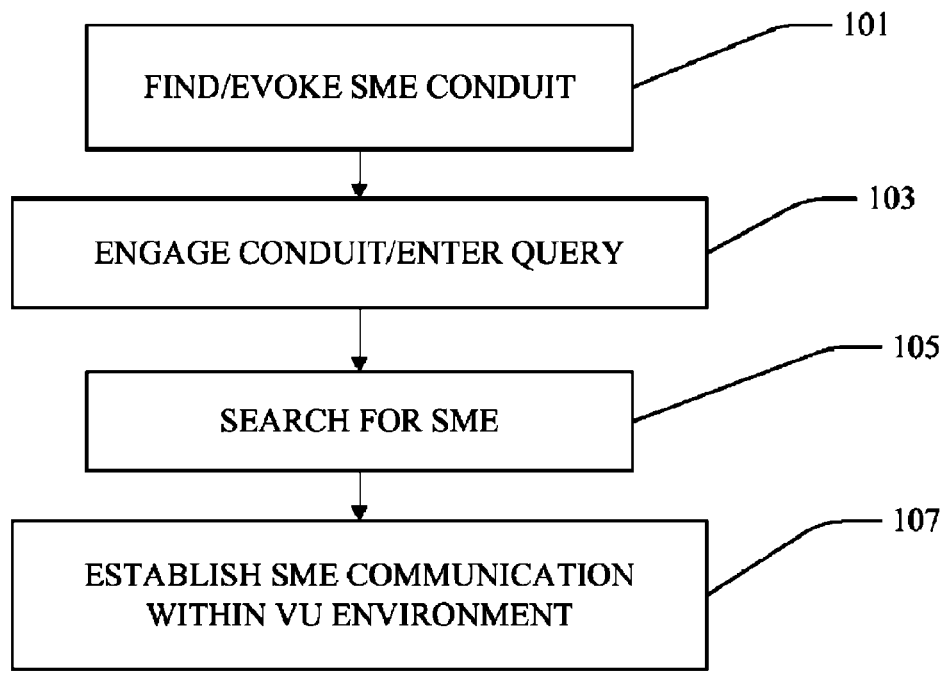
FIG. 1 is a flow chart illustrating a process and system for enabling virtual universe residents to find and engage subject matter experts within a virtual universe according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience purposes, the Detailed Description of the Invention has the following sections:
I. General Description; and
II. Computerized Implementation.

I. General Description

A subject matter expert (SME), or expert-avatar, may be defined as an entity exhibiting a high level of knowledge in a subject matter area or expertise in performing a specialized job, task, or skill within a subject matter, though one skilled in the art may recognize that other definitions may also apply. To counter loss of user engagement, and also to enhance VU usage and experiences, it is advantageous for VU region providers to provide service and information to VU users by populating their regions with subject matter expert avatars (SME avatars) managed and monitored with experts or other highly-trained customer service representatives, ideally engaging other VU users or residents within roles expected in the context of the VU, extending or enhancing the VU experience: for example, a SME avatar may appear as a Wizard in a fantasy-type of VU, immediately conveying SME status on magical powers to another user through appearance prior to any initial contact and thus in one aspect conveying SME status more efficiently than search-and-retrieve browser operations.

However, problems arise in providing SME avatars or otherwise configuring a VU region site to engage visitors twenty-four hours per day, seven days per week, as VU users may reside within any of the world's time zones. Hiring and training associates or employees to act as SME avatars and provide comprehensive and detailed information on a variety of topics is expensive and labor-intensive for region operators, and providing enough high-quality SME avatars around-the-clock is often unrealistic. Thus many virtual world regions constructed and managed by corporations and other service providers are deficient in staffing avatars able to answer specific or detailed questions or thoroughly discuss a company's products or services with each visitor, and are otherwise limited in their ability to provide desired information to visiting users/residents, commonly resulting in a failure to satisfy users seeking information and causing them to leave the VU for other resources.

Alternatively, a VU or a region thereof may be staffed with avatars operated by low-level intake or receptionist personnel or by automated "bot" avatars, thereby enabling expanded hours of service as well as increase the availability of customer service avatars. However, general intake greeters and bots are only able to greet and engage visitors on a superficial level, unable to provide detailed subject matter information without either referring a visitor avatar to another party or performing some type of data search or look-up procedure. In one aspect the quality of such a referral or information look-up experience for a user is inversely proportional to the time expended and number of search term entry and result review iterations required to acquire the target information. Providing requisite detailed and specific information sought by a visitor may require multiple iterations over a significant or irritating time period. Thus unless a provider avatar can quickly and efficiently retrieve the target information or identify a good source for that information a user may terminate an avatar engagement and/or leave the region unsatisfied, which may result directly in loss of profits or business opportunities in a commercial or retail context.

FIG. 1 illustrates a process or system according to the present invention for finding and providing SME engagement within a virtual universe, and more particularly configured to enhance the user VU experience by finding and providing responsive SME avatar engagement within the expected context of the VU. In one advantage the user may remain immersed within the VU experience, in some examples continuing to play a role within the VU corresponding to their avatar (i.e. continuing to enjoy their VU experience as their VU avatar character in a fictional or fantasy world VU) while acquiring SME services that would otherwise require a departure from the VU back to the real world and a corresponding loss of user VU engagement to the detriment of VU region providers. Thus at 101 a user participating in a VU and seeking SME services finds or otherwise evokes an SME conduit provided in the VU, for example through an interaction by his avatar with a VU texture or by evoking the SME conduit through a specific user computer application interface within the context of his avatar. Examples of the SME conduit include an avatar, a texture or other item tangible to the user's avatar (i.e. it may be touched or approached within a presence-detection proximity which evokes a response), or an interface menu item; some embodiments are described more fully below, and other examples will be apparent to one skilled in the art.

At 103 the user engages the SME conduit and enters a query for desired information through a VU-appropriate entry means. For example if the SME conduit is an avatar the user may ask the query through a chat or voice interface. At 105 the SME conduit searches for an appropriate SME that meets one or more requirements of the query, and if an appropriate SME is found then at 107 establishes an engagement of the user's avatar with the found SME in a manner consistent with the user's expectations as defined by the VU. For example in some chat-based SME conduit-avatar embodiments a first SME conduit-avatar engaged at 103 and 105 may be represented by a provider intake representative, the same avatar then populated by and representative of a second found provider SME at 107 in a transparent fashion, the SME conduit/populated avatar presented to the user appearing as the same consistent avatar through each of process steps 103-105-107.

Figure 2:
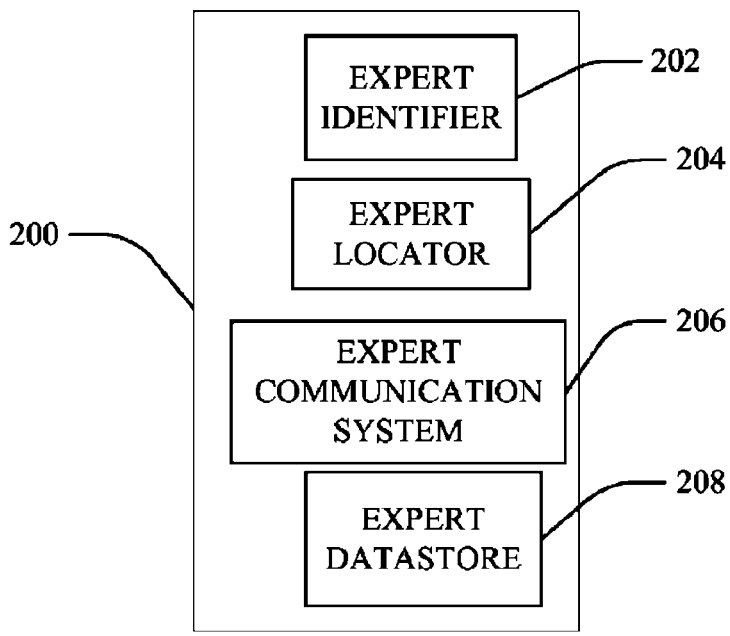
FIG. 2 is a block diagram illustration of a subject matter expert conduit according to the present invention.

FIG. 2 illustrates one embodiment of a SME conduit 200 according to the present invention comprising four components: a Subject Matter Expert Identifier 202, a Subject Matter Expert Locator 204, a Subject Matter Expert Communication System 206 and a Subject Matter Expert Datastore 208. Although the present embodiment illustrates one comprehensive SME conduit 200 comprising each of the four components 202/204/206/208, it will be understood that each component may reside in divergent locations and take separate tangible or non-tangible form in the VU: thus in one embodiment the Subject Matter Expert Locator 204 may be associated with a VU texture and thus amenable to direct interaction with a user avatar through an application directly communicating with an avatar's user computer application or interface, and the Subject Matter Expert Datastore 208 may also be associated with another texture within the VU; moreover, one or more of the components 202/204/206/208 may be located separately in one or more other computer applications in communication with the other remaining components 202, 204, 206, and/or 208.

In one embodiment the Subject Matter Expert Identifier 202 comprises one or more methods or processes for "tagging" or identifying a VU avatar, the avatar's agent or human or other entity represented by the avatar as an expert, thereby rendering the avatar as a SME avatar. In one example the Subject Matter Expert Identifier 202 uses social identification to define a VU avatar as a SME avatar, wherein other VU residents tag an avatar as an expert in a subject. In some embodiments multiple independent and unique avatars must tag another avatar as an expert, for example a threshold minimum tag count must be reached prior to a SME avatar connotation. Tagging by another avatar may be achieved through various methods and processes, for example including invoking a context menu on a selected avatar. A single avatar may also be tagged as an expert in multiple subjects. With each tag an entry is made into a data store component and associated with the tagged avatar, for example the Subject Matter Expert Datastore 208 described below.

In some embodiments the Subject Matter Expert Identifier 202 uses self-identification to define a VU avatar as a SME avatar, wherein VU residents may tag themselves as an expert in a subject. Some embodiments may require confirmation of expertise by requiring concurrence with the self-rating through one or more additional methods of expert status identification, for example through one or more of the other methods and processes described herein.

The Subject Matter Expert Identifier 202 may also use hierarchical identification through organizational structures and methodology. For example experts may be found and tagged as a function of their status (titles, job descriptions, departments, etc.) within a company hierarchy; in one aspect this information is commonly available in on-line company directories, and thus the Subject Matter Expert Identifier 202 may be configured to find and tag a SME avatar as a function of information data acquired by crawling through an on-line directory and parsing the information. Other parties within an organization may also tag a party as an expert as a function of their relative status within the hierarchy: thus a person higher in a hierarchy may be authorized to tag subordinates as subject matter experts; or a person having reliable hierarchical status may be enabled to tag another person as an expert (for example a person listed in an Information Technology Services department may be authorized to tag a user in another department as a "C++ programming expert."

Subject Matter Expert Identifiers 202 may also use derived identification methods and processes. In one example a Subject Matter Expert Identifier 202 is configured to access to an on-line company directory and tag users as subject matter experts as a function of expert tagging status of one or more other users within the same hierarchical "group" or "team," in one embodiment as function of the percentage of people within the same "group" or "team" that are tagged as an expert: thus in one example if 80 percent of a team is denoted expert in a given subject, the Subject Matter Expert Identifier 202 may tag the rest of the team as expert in the same subject, in some embodiments provisionally or dependent upon another confirmation tag.

Subject Matter Expert Identifiers 202 may also use avatar inventory identification methods and processes, wherein a user avatar is analyzed to detect a potential or determine a degree of likelihood that a user is an expert in a particular subject. For example, if a user's avatar inventory contains seven virtual reference documents on a given subject, then it is likely that the user is an expert on that subject and may be tagged accordingly. The Subject Matter Expert Identifier 202 may be configured to periodically review or update avatar inventory analyses, or in response to notification of the addition of a new item to a user avatar inventory.

The Subject Matter Expert Identifier 202 may also be configured to consider user region identification and history data. In one example a user spending a relatively large amount of time within a particular region indicates a high probability that the user is an expert in that region: thus for a given region tagged or having relevant textual descriptions or associations an automated Subject Matter Expert Identifier 202 may tag avatars who spend relatively large amounts of time in that region as experts based on the land description. For example, if a region is tagged as "Acme Mountain Bike Corporation" and "suspension fork specifications and repair" it would be likely or probable that a user who spends 90% of their VU time in this region is an expert in both the Acme Mountain Bike Corporation and their suspension fork specifications and repair.

Figures 4A, 4B:
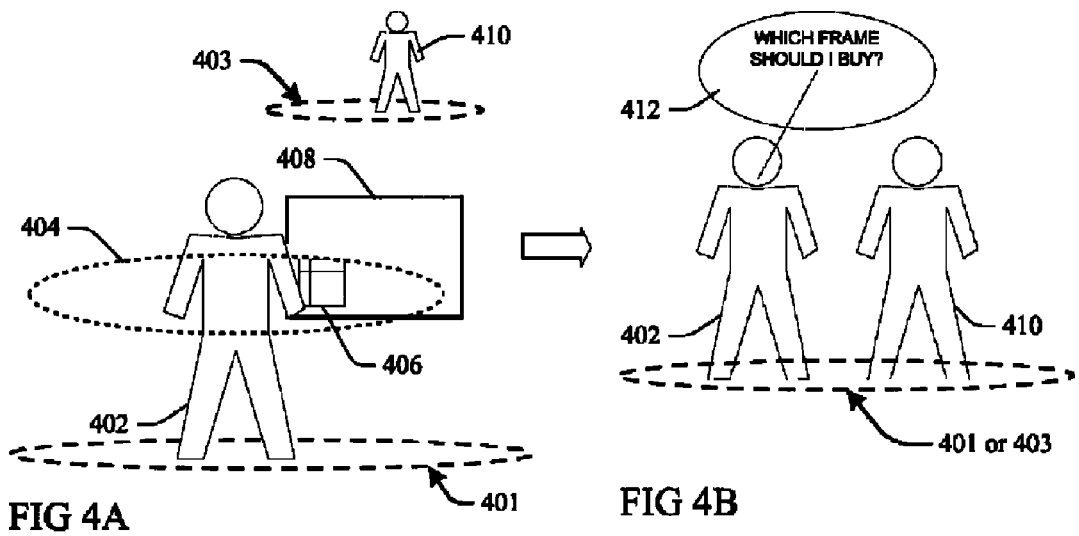
FIGS. 4A and 4B are diagrammatic illustrations of a conduit texture in relation to user and subject matter expert avatars within a virtual universe according to the present invention.

The Subject Matter Expert Locator 204 component finds experts in one or more particular subjects. Methods and processes used may be region-specific or universal throughout one or more VU's. And some embodiments may use synonyms or other "equivalent terms" in place of and/or in addition to user-provided words or object tags, as will be understood by one skilled in the art. In some embodiments the Subject Matter Expert Locator 204 is associated with one or more VU kiosks, which are static programmed objects placed at strategic locations around a VU and tagged with keywords or categories. For example, FIG. 4A illustrates a user avatar 402 and a kiosk texture 408 both located within a first location 401 in a virtual universe. Thus when a user wishes to learn more information from a subject matter expert they may navigate their avatar 402 to an appropriate kiosk 408 and have their avatar touch a tagged object 406 on the kiosk 408, wherein the kiosk Subject Matter Expert Locator 204 is configured to responsively query one or more databases and select a matching subject matter expert identified by the query and represented in the VU by an avatar 410 located in another, second location 403 in the virtual universe; in some embodiments identification of the subject matter expert may also automatically invoke the Subject Matter Expert Communication System 206 to allow the user avatar to engage an avatar representative of the identified subject matter expert, for example through the Subject Matter Expert Communication System 206 described below.

A user's VU client may also be augmented or otherwise configured to enable access to the Subject Matter Expert Locator 204 through use of the client's menu system. For example a graphical user interface (GUI) pull-down or toolbar menu option item may be presented to a VU user to contact a subject matter expert, wherein user-invocation of the menu item through a cursor routine results in a prompt to the user to enter search terms or tags describing the expert or subject matter sought, the client responsively querying the Subject Matter Expert Datastore 208 or other databases and selecting a subject matter expert as a function of the terms provided. In another aspect client context-menu options with respect to a VU objects may be modified, wherein a user's avatar selection of an object, or a direct GUI selection through a mouse or a keyboard input, displays a "context" menu of actions appropriate for the selected object including an option to search for subject matter experts on the object. In some embodiments context-menu subject matter expert search options are limited to VU objects containing descriptive text, the descriptive text amenable to automatically or manually/selectively providing search terms for the Subject Matter Expert Locator 204, although those skilled in the art will appreciate other variations and combinations may be practiced in selecting an object and invoking a search for a subject matter expert relevant to one or more non-text attributes of the object. And in some embodiments identification of a tagged expert by the Subject Matter Expert Locator 204 automatically enables communication between the user and the expert's associated SME avatar, for example by invoking the Subject Matter Expert Communication System 206 described below.

The Subject Matter Expert Locator 204 may be invoked through search texture locator configurations. More particularly, geometries or textures within a virtual universe may be used as a conduit to search for subject matter experts. In some embodiments a user may encounter a floating "WIDGET" logo in the foyer of a "Widget Corporation" building provided in a VU, wherein selecting the logo enables or prompts the user to input subject matter expert search terms, for example by entering terms into a texture text input field invoked by the selection or through a tool bar, menu or context-menu option, the terms input invoking Subject Matter Expert Locator 204 logic to perform a SME search. The Subject Matter Expert Locator 204 may also be configured to search for subject matter experts both within and without the present VU.

The Subject Matter Expert Communication System 206 enables communication between a user avatar and a subject matter expert or an associated SME avatar. Some embodiments may enable searching and querying or notifying subject matter experts not presently logged in or otherwise located outside of the current virtual universe, for example contacting a subject matter expert through other communication applications through text messaging or forwarding a spoken question from a user avatar, wherein upon receipt of notification or query the subject matter expert may respond by logging in the virtual universe and initiating communication with the requesting user's avatar through a SME avatar, or by sending a responsively reply message back (illustrative but not exhaustive examples include text message, spoken answer, file, reference link, further referral, etc.). In some embodiments, an instant messaging (IM) or chat session is automatically invoked between the subject matter expert and the user avatar. In one advantage IM and chat are efficient communication mediums, enabling a contacted expert to also communicate simultaneously with multiple user avatars seeking the expert, as well as allowing the expert to further multitask by running other applications and performing other tasks, this efficiency minimizing the demands on the subject matter expert's time and resources and thus encouraging responses to the requesting VU user.

In another aspect, the Subject Matter Expert Communication System 206 may provide contact information to the requestor, who may then choose to engage the expert in any fashion, either immediately or at some later time. Thus, some embodiments provide the requestor of an expert with an expert name, enabling the requestor to communicate with the expert using conventional VU mediums such as instant messaging or teleportation invitations. Some embodiments may also supply the requestor with the current VU location of the expert, for example the location 403 of the expert's avatar 410 illustrated in FIG. 4A, thus enabling the user requestor to opt to either navigate to the expert's location 403, or to navigate the expert's avatar 410 from its location 403 to the user avatar's location 401, in order for the user avatar 402 to engage the expert avatar 410 in communication 412 as shown in FIG. 4B, and in some embodiments the Subject Matter Expert Communication System 206 may directly teleport the requestor's avatar 402 to the location 403 of the expert avatar 410, either through offering and executing teleportation upon acceptance by the requestor, or automatically without prompting for confirmation.

The Subject Matter Expert Datastore 208 stores data associating subjects and experts, for example associating subject tags with experts, and allows searching of subject tags to retrieve lists of experts on those subjects. Tags may be associated with experts using data mapping techniques, such as for example data mapping means available in relational databases, and as will be appreciated by one skilled in the art the Datastore 208 may be searched or queried to return a list of experts in a supplied subject, for example by returning a list of matching objects from a database for a supplied term.

The Subject Matter Expert Datastore 208 may correlate multiple tags to a given SME avatar, for example for Subject Matter Expert Identifiers 202 configured to require multiple tagging of an avatar before denoting an avatar as a SME avatar. In one example the Datastore 208 is configured to promote an avatar to a SME avatar through multiple tag correlation: for example, upon receipt of an avatar expert status identification relative to an avatar the Datastore 208 detects the number of tags or other expert identifications already stored with respect to the avatar, and if the total number of previous tags incremented with the received incoming tag exceeds a predefined threshold then the avatar is "promoted" to a SME avatar on the supplied subject.

The Datastore 208 may also be configured to correlate multiple types of identification and responsively denote subject matter expert status. For example, for a Subject Matter Expert Identifier 202 requiring multiple types of identification before denoting someone as a subject matter expert, upon receipt of an expert identification relative to a first avatar a Datastore 208 detects which and how many other methods have previously identified said first avatar as an expert in the supplied subject, and if the total number of previously identified methods incremented with the received identification exceeds a predefined threshold then said first avatar is "promoted" to SME avatar relative to the supplied subject.

Experts may be enabled to manipulate their entries in the Datastore 208, for example directly through a real-life computer application communication medium and structure, or through a virtual universe interface through an interaction of their avatar with a VU object or texture associated with the Datastore 208. In one advantage the Datastore 208 may enable a subject matter expert user to remove incorrect or obsolete categories they have been identified as experts for, thus enhancing requestor's experiences by reducing false matches. In another aspect subject matter experts may also add new subjects, in some embodiments subject to verification (for example through multiple tags or methods as described above).

In another aspect, the subject matter expert system/process 200 or one or more of its components 202, 204, 206 and 208 may observe and track analytics and process and analyze the same to improve the user's experience. For example, user requests for assistance can be traced back to particular requester units, requesting users and/or locations, and data associated therewith stored in the Datastore 208 or other storage means. Data statistics may also be observed, determined and recorded, for example on request numbers and frequencies or on request answer frequencies.

II. Computerized Implementation

Figure 3:
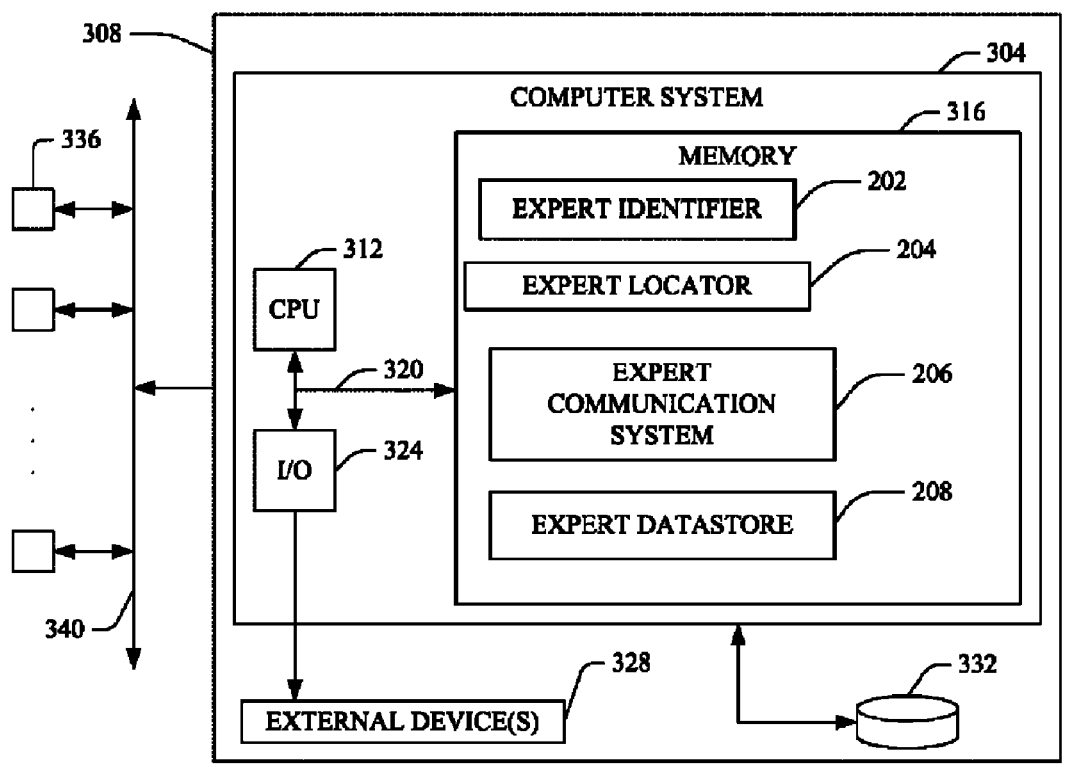
FIG. 3 is a block diagram illustrating an exemplary computerized implementation of a system and method for enabling virtual universe residents to find and engage subject matter experts within a virtual universe according to the present invention.

The present invention may be implemented within a stand-alone VU application, or as a plug-in to an existing VU application. Referring now to FIG. 3, an exemplary computerized implementation includes a computer system 304 deployed within a computer infrastructure 308 such as a computer or a programmable device such as a personal digital assistant (PDA) or cellular phone. This is intended to demonstrate, among other things, that the present invention could be implemented within a network environment 340 (e.g., the Internet, a wide area network (WAN), a local area network (LAN), a virtual private network (VPN), etc.) in communication with one or more additional computers 336, or on a stand-alone computer infrastructure 308. In the case of the former, communication throughout the network 340 can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

As shown, the computer system 304 includes a central processing unit (CPU) 312, a memory 316, a bus 320, and input/output (I/O) interfaces 324. Further, the computer system 304 is shown in communication with external I/O devices/resources 328 and storage system 332. In general, the processing unit 312 executes computer program code, such as the code to implement various components of the process and system for enabling virtual universe residents to find and engage subject matter experts within a virtual universe illustrated in FIGS. 1 and 2 and described above, including Subject Matter Expert Identifier 202, Subject Matter Expert Locator 204, Subject Matter Expert Communication System 206 and Subject Matter Expert Datastore 208 components discussed above, which are stored in memory 316 and/or storage system 332. It is to be appreciated that two or more, including all, of these components may be implemented as a single component.

While executing computer program code, the processing unit 312 can read and/or write data to/from the memory 316, the storage system 332, and/or the I/O interfaces 324. The bus 320 provides a communication link between each of the components in computer system 304. The external devices 328 can comprise any devices (e.g., keyboard, pointing device, display, etc.) that enable a user to interact with computer system 304 and/or any devices (e.g., network card, modem, etc.) that enable computer system 304 to communicate with one or more other computing devices.

The computer infrastructure 308 is only illustrative of various types of computer infrastructures for implementing the invention. For example, in one embodiment, computer infrastructure 308 comprises two or more computing devices (e.g., a server cluster) that communicate over a network to perform the various process steps of the invention. Moreover, computer system 304 is only representative of various possible computer systems that can include numerous combinations of hardware.

To this extent, in other embodiments, the computer system 304 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively. Moreover, the processing unit 312 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations.

Further, I/O interfaces 324 can comprise any system for exchanging information with one or more of the external device 328. Still further, it is understood that one or more additional components (e.g., system software, math co-processing unit, etc.) not shown in FIG. 3 can be included in computer system 304. However, if computer system 304 comprises a handheld device or the like, it is understood that one or more of the external devices 328 (e.g., a display) and/or the storage system 332 could be contained within computer system 304, not externally as shown.

The storage system 332 can be any type of system (e.g., a database) capable of providing storage for information under the present invention. To this extent, the storage system 332 could include one or more storage devices, such as a magnetic disk drive or an optical disk drive. In another embodiment, the storage system 332 includes data distributed across, for example, a local area network (LAN), wide area network (WAN) or a storage area network (SAN) (not shown). In addition, although not shown, additional components, such as cache memory, communication systems, system software, etc., may be incorporated into computer system 304.

While shown and described herein as a method and a system, it is understood that the invention further provides various alternative embodiments. For example, in one embodiment, the invention provides a computer-readable/useable medium that includes computer program code to enable a computer infrastructure to enable virtual universe residents to find and engage subject matter experts within a virtual universe. To this extent, the computer-readable/useable medium includes program code that implements each of the various process steps of the invention.

It is understood that the terms "computer-readable medium" or "computer useable medium" comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 316 and/or the storage system 332 (e.g., a fixed disk, a read-only memory, a random access memory, a cache memory, etc.), and/or as a data signal (e.g., a propagated signal) traveling over a network (e.g., during a wired/wireless electronic distribution of the program code).

Still yet, computer infrastructure 308 is intended to demonstrate that some or all of the components of implementation could be deployed, managed, serviced, etc. by a service provider who offers to implement, deploy, and/or perform the functions of the present invention for others, for example by licensing methods and browser or application server technology according to the present invention to an internet service providers (ISP) or cellular telephone provider. In one embodiment the invention may comprise a business method that performs the process steps of the invention on a subscription, advertising, and/or fee basis. Thus a service provider can create, maintain, support, etc., a computer infrastructure, such as the computer infrastructure 308 that performs the process steps of the invention for one or more customers, and in return the service provider can receive payment from the customer(s) under a subscription and/or fee agreement and/or the service provider can receive payment from the sale of advertising content to one or more third parties.

In still another embodiment, the invention provides a computer-implemented method for enabling virtual universe residents to find and engage subject matter experts within a virtual universe. In this case, a computer infrastructure, such as computer infrastructure 308, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as computer system 304, from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for enabling virtual universe users to find and engage subject matter experts within an expected role context of a virtual universe, comprising:
    presenting a conduit avatar populated by an intake representative to a user within a virtual universe;
    an avatar of a user engaging the conduit avatar within an expected role context of the virtual universe corresponding to the user and conduit avatars, the engaging comprising a query to the conduit avatar indicating a subject matter expert search term;
    searching a data storage in communication with the conduit avatar for a tag relevant to the search term;
    identifying and locating a subject matter expert tagged with the relevant tag;
    populating the conduit avatar with the located subject matter expert; and
    the located subject matter expert communicating directly with the user avatar via the conduit avatar populated by the located subject matter expert, the communicating entirely within the expected role context of the user and conduit avatars and within the virtual universe and without the user directly engaging a resource outside of the virtual universe and without requiring the user to engage in a communication interface outside of the virtual universe; and
    wherein the conduit avatar appears to the user as a same consistent avatar within the expected role context of the user and conduit avatars while the conduit avatar is populated by the intake representative and by the located subject matter expert.

2. The method of claim 1, further comprising:
    identifying the located subject matter expert as a function of a tagging of the identified subject matter expert as an expert on the indicated subject matter expert search term by at least one of:
    a plurality of unique virtual universe users;
    a confirming virtual universe user; and
    an authoritative virtual universe user having an authority status relative to the identified expert-avatar as a function of a hierarchical organizational relationship of the authoritative virtual universe user with respect to the identified expert-avatar.

3. The method of claim 1, further comprising:
    tagging the located subject matter expert with the relevant tag as an expert on the indicated subject matter expert search term as a function of at least one of:
    crawling through an on-line organizational directory and parsing information in the directory;
    analyzing an agent inventory of the identified expert-avatar; and
    identifying an association of an avatar of the located subject matter expert with a group of other avatars, the group of other avatars comprising a threshold percentage of tagged expert avatars.

4. The method of claim 1, further comprising:
    tagging the located subject matter expert with the relevant tag as an expert on the indicated subject matter expert search term if a tag count of a multiple tagging of the located subject matter expert with the relevant tag by a plurality of different tagging virtual universe users exceeds a minimum threshold.

5. A method for enabling virtual universe users to find and engage subject matter experts within an expected context of a virtual universe, comprising:
    an avatar of a user engaging a conduit texture presented within a graphic environment of a virtual universe by physically contacting an object on the conduit texture that is tagged with a tag relevant to a query search term, the engaging indicating the query search term;
    in response to the engaging the texture, automatically searching a data storage in communication with the conduit texture for a tag relevant to the query search term, identifying and locating a subject matter expert tagged with the relevant tag, and teleporting one of the user avatar and the subject matter expert avatar to an other of the user avatar and the subject matter expert avatar; and
    the located subject matter expert communicating directly with the user avatar via a subject matter expert avatar, the communicating entirely within an expected role context of the user avatar and the subject matter expert avatar within the virtual universe, the communicating without the user directly engaging a resource outside of the virtual universe and without requiring the user to engage in a communication interface outside of the virtual universe.

6. The method of claim 5, further comprising:
prompting the user to input subject matter expert search terms comprising the query search term in a text input field in response to the user avatar engaging the conduit texture presented within the graphic environment of the virtual universe.

7. An article of manufacture for enabling virtual universe users to find and engage subject matter experts within an expected role context of a virtual universe, comprising:
a computer storage medium device having computer readable program code embodied therewith to be deployed and executed on a computer system, the computer readable program code comprising instructions that, when executed on a computer system, cause the computer system to: present a conduit avatar populated by an intake representative to a user within a virtual universe, wherein the conduit avatar determines a subject matter expert search term from an engagement of the conduit avatar by an avatar of a user within an expected role context of the virtual universe corresponding to the user and conduit avatars;
search a data storage in communication with the conduit avatar for a tag relevant to the search term;
identify and locate a subject matter expert tagged with the relevant tag;
populate the conduit avatar with the located subject matter expert; and
enable the user to directly communicate via the user avatar with the located subject matter expert via the conduit avatar populated by the located subject matter expert through a conduit avatar communication medium entirely within the expected role context of the user and conduit avatars and within the virtual universe and without the user directly engaging a resource outside of the virtual universe and without requiring the user to engage in an interface outside of the virtual universe; and
wherein the conduit avatar appears to the user as a same consistent avatar within the expected role context of the user and conduit avatars while the conduit avatar is populated by the intake representative and by the located subject matter expert.

8. The article of manufacture of claim 7, wherein the program code instructions, when executed by the computer system, further cause the computer system to identify the located subject matter expert as an expert on the indicated subject matter expert search term as a function of a tagging of the located subject matter expert by at least one of:
a plurality of unique virtual universe users;
a confirming virtual universe user; and
an authoritative virtual universe user having an authority status relative to the identified expert-avatar as a function of a hierarchical organizational relationship of the authoritative virtual universe user with respect to the identified expert-avatar.

9. The article of manufacture of claim 7, wherein the program code instructions, when executed on the computer system, further cause the computer system to tag the located subject matter expert as an expert on the indicated subject matter expert search term as a function of at least one of:
crawling through an on-line organizational directory and parsing information in the directory;
analyzing an agent inventory of the identified expert-avatar; or
identifying an association of an avatar of the located subject matter expert with a group of other avatars, the group of other avatars comprising a threshold percentage of tagged expert avatars.

10. The article of manufacture of claim 7, wherein the program code instructions, when executed on the computer system, further cause the computer system to tag the located subject matter expert with the relevant tag as an expert on the indicated subject matter expert search term if a tag count of a multiple tagging of the located subject matter expert with the relevant tag by a plurality of different tagging virtual universe users exceeds a minimum threshold.

11. A programmable device comprising:
a processing means;
a memory in communication with the processing means comprising a subject matter expert identifier logic component, a subject matter expert locator logic component, a subject matter expert communication system logic component and a subject matter expert datastore logic component; and
a network interface in communication with the processing means and the memory;
wherein the processing means is configured to present a conduit within a graphic environment of a virtual universe;
wherein the subject matter expert locator component is configured to receive a subject matter expert search term from an engagement of the conduit texture by an avatar of a virtual universe user, wherein the engagement indicates a query search term and is a physical contact of an object on the conduit texture that is tagged with a tag relevant to the query search term, the physical contact by the user avatar;
wherein the subject matter expert locator component is configured to, in response to the engagement, automatically search a data storage means in communication with the network interface for a tag relevant to the search term, identify and locate a subject matter expert tagged with the relevant tag, and teleport one of the user avatar and the subject matter expert avatar to an other of the user avatar and the subject matter expert avatar; and
wherein the subject matter expert communication system component is configured to enable the user to directly communicate via the user avatar with the located subject matter expert via a subject matter expert avatar through a conduit avatar communication medium entirely within an expected role context of the user avatar and the subject matter expert avatar within the virtual universe and without the user directly engaging a resource outside of the virtual universe and without requiring the user to engage in an interface outside of the virtual universe.

12. The programmable device of claim 11, wherein processing means is configured to tag the located subject matter expert with the relevant tag as an expert on the indicated subject matter expert search term by at least one of:
crawling through an on-line organizational directory and parsing information in the directory;
analyzing an agent inventory of the expert-avatar; and
identifying an association of an avatar of the located subject matter expert with a group of other avatars, the group of other avatars comprising a threshold percentage of tagged expert avatars.

13. The programmable device of claim 11, wherein the processing means is configured to prompt the user to input subject matter expert search terms comprising the query search term in a text input field in response to the user avatar engagement of the conduit texture presented within the graphic environment of the virtual universe.

* * * * *